United States Patent [19]

Dossier

[11] Patent Number: 4,774,864
[45] Date of Patent: Oct. 4, 1988

[54] DYNAMOMETRIC SCREW-DRIVER

[75] Inventor: Michel Dossier, Paris, France

[73] Assignee: Facom, Morangis, France

[21] Appl. No.: 883,811

[22] Filed: Jul. 9, 1986

[30] Foreign Application Priority Data

Jul. 11, 1985 [FR] France .................. 85 10 672

[51] Int. Cl.⁴ .................. B25B 23/157; B25B 23/159
[52] U.S. Cl. .................. 81/474; 81/476; 81/477
[58] Field of Search .................. 81/467, 473–477

[56] References Cited

U.S. PATENT DOCUMENTS

| | | | |
|---|---|---|---|
| 1,954,620 | 4/1934 | Connell | 81/475 X |
| 3,001,430 | 9/1961 | Cranford | 81/474 |
| 3,890,859 | 6/1975 | Grabovac et al. | 81/474 |
| 3,984,997 | 10/1976 | Dossier . | |
| 4,063,474 | 12/1977 | Klopping | 81/474 |

FOREIGN PATENT DOCUMENTS

| | | |
|---|---|---|
| 1370937 | 9/1963 | France . |
| 2250403 | 5/1975 | France . |
| 2353752 | 12/1977 | France . |
| 2384592 | 10/1978 | France . |

*Primary Examiner*—Debra S. Meislin
*Attorney, Agent, or Firm*—Wenderoth, Lind & Ponack

[57] ABSTRACT

A screw-driver includes, disposed inside a driving handle, a torque limiter having a torsion spring in which one end of a helical friction band carries a ring connected by axial splines to a stem of the tool while the corresponding end of the torsion spring is fixed to a ring connected to the stem by a helical spline. An adjusting sleeve solely movable in rotation is screwed on the stem and, when it rotates, causes an axial displacement of the stem and modifies the relative angular setting of the two end rings, i.e. the torsion of the spring and consequently the value of the sliding torque.

9 Claims, 1 Drawing Sheet

DYNAMOMETRIC SCREW-DRIVER

BACKGROUND OF THE INVENTION

The present invention relates to a dynamometric screw-driver comprising a friction torque limiter and more particularly a torque limiter having a torsion spring of the type disclosed in FR-A-2 250 403, i.e. a torque limiter comprising a helical friction band coupled at both ends to a torsion spring which is coaxial therewith. This torque limiter is mounted inside the tubular handle of the screw-driver between two axial abutments so that the torsion spring applies the helical band against the inner surface of the handle. Further, the helical band and the torsion spring are connected at one of their coupled ends to the stem of the tool.

Screw-drivers of this type are particularly reliable since their torque limiter ensures both the stability of the sliding torque upon rotation in the screwing direction and an absence of sliding upon rotation in the unscrewing direction. Further, the sliding torque is insensitive to variations in the coefficient of friction. A serious problem is however presented by the adjustment of the sliding torque of the torque limiter. Indeed, this adjustment requires the adjustment of the torsion of the spring which can only be achieved by exterior means, the same being true in respect of the measurement of the torque obtained.

Now, a dynamometric screw-driver is a hand tool which must be capable of being conveniently adjusted at any moment by the user with no accessory tooling or auxiliary measuring bench.

SUMMARY OF THE INVENTION

An object of the present invention is therefore to provide a dynamometric screw-driver provided with a torque limiter having torsion spring means which can be easily adjusted by a user in a precise and reliable manner.

The invention therefore provides a dynamometric screw-driver comprising, inside a tubular handle, between two axial abutments, a torque limiter comprising a helical friction band and a torsion spring coaxial with said band and applying it against the inner surface of the handle, which are coupled together at one of their ends and both coupled together and to the stem of the tool at their other ends, wherein the torsion spring and the helical band are coupled to the stem of the tool through two rings connected to the tool by splines of different inclinations, while an adjusting sleeve axially connected to the handle is screwed at the end of the handle on the stem of the tool so that the rotation of the sleeve and the axial displacement of said stem cause a relative angular displacement of the end ring of the spring relative to the ring of the friction band and adjust the relative angular setting of said ends.

According to one embodiment of the invention, the ring mounted on the end of the friction band is connected to the stem of the tool by axial grooves while the ring fixed to the end of the torsion spring is connected to said stem by helical splines.

A simple rotation of the sleeve thus enables the user of the screw-driver to modify the torsion of the spring and consequently the sliding torque.

According to another feature of the invention, the screw-driver further comprises an adjusting control drum which is carried by the stem of the tool and extends around the adjusting sleeve, graduations being provided on the outer side of these two elements.

The value of the sliding torque obtained is thus automatically known by the user during its adjustment.

BRIEF DESCRIPTION OF THE DRAWINGS

The following description of an embodiment, given by way a non-limiting example and shown in the accompanying drawings, will bring out the features and advantages of the invention. In the drawings.

DETAILED DESCRIPTION OF THE INVENTION

Figure 1:
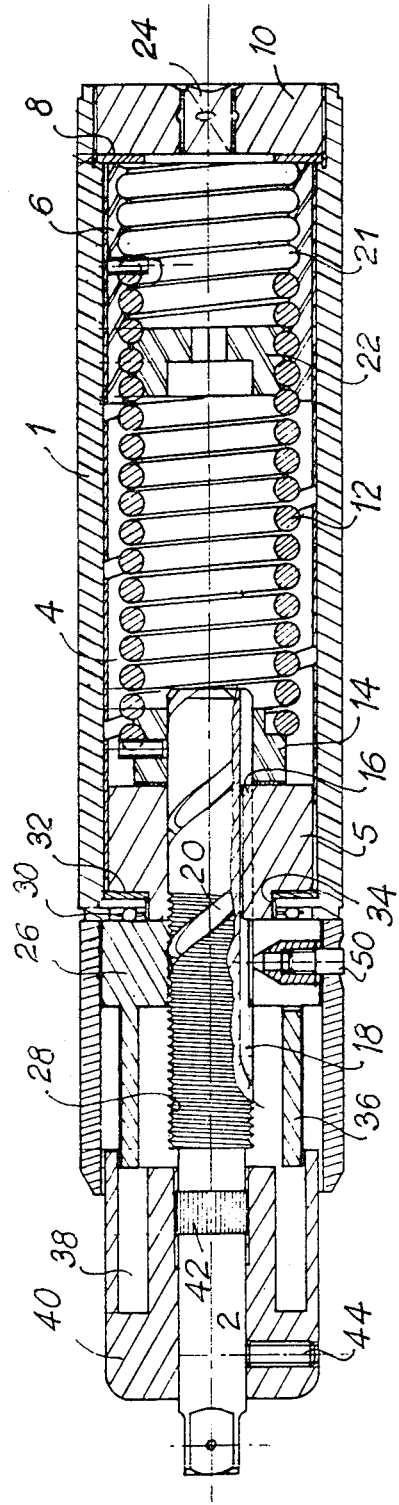
FIG. 1 is a longitudinal sectional view of a dynamometric screw-driver according to the invention.
Figure 2:
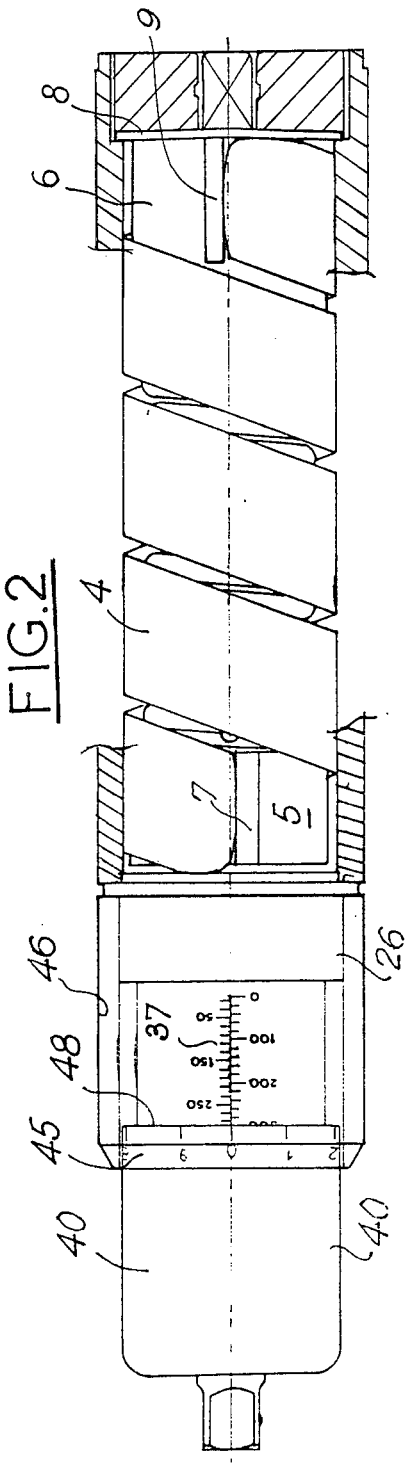
FIG. 2 is a side elevational view of this screw-driver, the tubular handle of which has been partly cut away in order to show the helical friction band.

This dynamometric screw-driver comprises a tubular driving handle 1 which is connected to a stem 2 for driving the tool through a torque limiter having torsion spring means. Indeed, there is mounted inside the handle 1 a helical band 4 which tangentially abuts at one of its ends against a portion 7 of a ring 5 and at its other end against a portion 9 of a bushing or ring 6 which bears against a washer 8 held in position by an end wall 10 of the handle 1. A torsion spring 12, constituted, in the illustrated embodiment, by a coil spring, is mounted coaxially within the helical band 4 and is fixed at one of its ends in the bushing 6 and at its other end on a ring 14 which bears against the ring 5. The two rings 5 and 14 are moreover connected to the stem 2 by splines. The ring 5 has at least one rib 16 engaged in an axial spline 18 in the stem 2 and is thus connected to rotate with the latter. The ring 14 is connected to the stem 2 by a helical spline or groove 20 which is provided in this stem and in which is slidable a spline or rib integral with the ring 14 (this spline is not visible in the drawings).

The rotation of the handle 1 is thus transmitted to the stem 2 through the helical band 4 and the ring 5, the torsion spring 12 applying the helical band 4 against the inner surface of the handle up to the moment when the sliding torque is reached.

Preferably, the bushing 6 includes a helical inner groove 21 in which the end coils of the spring 12 are fitted. Further, a core member 22 provided with a similar groove on its outer surface is screwed inside the bushing 6 on the coils of the spring which it immobilizes.

The effective length of the torsion spring 12, and consequently its resilience, is thus determined by the length of the coils between the core member 22 and the ring 14. An adjustment of the position of this core member 22 can be achieved by introducing a tool from outside the screw-driver through an orifice 24 provided in the end wall 10 of the handle 1.

At its end remote from this end wall 10, the handle 1 carries an adjusting sleeve 26 which is screwed on a corresponding screwthread 28 on the stem 2. It is axially held stationary relative to the handle 1 to which it is connected by a ball bearing 30 mounted therebetween and a washer 32 around an axial extension 34 of the ring 5 with which it is in contact.

Preferably, the sleeve 26 is extended by a skirt 36 which carries a longitudinal graduation 37 whose graduation corresponds to the pitch of the screwthread 28 provided on the stem 2. The skirt 36 has an end portion which extends into a circular cavity of a control drum 40 connected to the stem 2 by axial splines 42 which permits the adjustment of its axial and angular position but is rigid with this stem owing to the provision of a set screw 44. The outer surface of the drum 40 carries at its end in the vicinity of the skirt 36 a circular graduation 45, for example graduated in tenths of a turn. This graduation 45 and the edge of the drum 40 are placed in front of the skirt 36 at a point determined by the graduation 37 according to the relative position of the sleeve 26 and the drum 40. A transparent outer sheath 46 fixed to the sleeve 26 in the extension of the handle 1 protects the skirt 36 and a part of the drum 40 while it allows the reading of the graduations carried by these two elements. Further, this sheath 46 carries a control button of a locking device 50 which interconnects the sleeve 26 and the stem 2.

When a user of the screw-driver wishes to adjust the latter for a given sliding torque, it is merely required, after having released the locking device 50, to turn the sheath 46, and the sleeve 26 connected thereto, which results in an axial displacement of the stem 2. This stem slides in the ring 5 which remains stationary while it causes the angular displacement of the ring 14 whose spline is driven by the helical groove 20, the angular setting of this ring 14 with respect to the ring 5 of the end of the friction band is thus modified, as is the torsion of the spring 12.

As the sleeve 26 is rotated, the drum 40 is axially displaced at the same time as the stem 2 so that its end edge 48 travels through a part of the graduation 37 which corresponds exactly to the number of turns of the sleeve 26. Further, the axis of the graduation 37 has been angularly displaced relative to the graduation 45 so that the combination of the two graduations gives the exact measurement of the displacement of the stem 2 and consequently of the modification of the torsion of the spring and of the resulting sliding torque.

These graduations provide directly the values of the sliding torque and, as soon as the desired torque is reached, a pressure exerted on the control button of the locking device 50 puts the latterback into action so that the sleeve 26 is immobilized with respect to the stem 2 and prevents any risk of modification of the adjustment.

The screw-driver is then ready to be used, i.e. to operate in the usual manner, the handle 1 driving by the effect of friction the helical band 4 and the ring 5 which causes the rotation of the stem 2 now rigid with the sleeve 26.

It will be understood that the splines which connect the rings 5 and 14 to the stem 2 may have forms other than those just described so long as the splines connecting each of the two rings have different inclinations and cause a relative angular displacement of these two rings when the stem 2 undergoes an axial displacement. For example, the end ring 5 of the helical band may be connected to the stem by helical splines while the ring 14 is connected thereto by axial splines, or by other helical splines having a different pitch. In some cases, even the ring 14 may be fixed to the stem 2 while the other ring is connected to the stem by helical splines.

Whatever the embodiment chosen, the rotation of the adjusting sleeve 26 about the stem 2 results in a modification in the relative angular setting of the two end rings 5, 14, while the rotation of the driving handle 1 causes a simultaneous rotation of the ring 5 and of the stem 2 until the sliding torque is reached.

There is therefore provided a dynamometric screw-driver which has all the safety of operation of the torque limiter having torsion spring means and which moreover can be adjusted at any moment by a user in a simple and precise manner.

What is claimed is:

1. A dynamometric screw-driver comprising a tubular handle having a tubular inner surface, a first inner axial abutment at a first end of the handle, a second inner axial abutment at a second end of the handle opposed to said first end, a torque limiter comprising a helical band mounted coaxially in the handle and in frictional contact with said inner surface, a first ring located within the handle and in axial abutting relation to said first abutment, a second ring located within the handle in adjacent relation to said second abutment, a stem slidably mounted in the first ring, a first end portion of the helical band being drivingly connected to the first ring for rotating the first ring in a counterclockwise direction corresponding to an unscrewing direction of rotation of the stem and a second end portion of the helical band opposed to said first end portion of the band being drivingly connected to the second ring for rotating the second ring in a clockwise direction corresponding to a screwing direction of rotation of the stem, a third ring slidably mounted on the stem, a torsion spring means for fixing a first end portion of the spring to the third ring and means for fixing a second end portion of the spring opposed to said first end portion of the spring to the second ring, first spline means interposed between and interconnecting the stem and the third ring, and second spline means interposed between and interconnecting the stem and the first ring, one spline means being a helical spline means making a helix angle relative to a plane perpendicular to the stem which is less than an angle made by the other spline means relative to said plane whereby axial movement of the stem relative to the first ring causes relative rotation between the third ring and the first ring whereby the spring can be put under a variable torsion which torsion is transmitted to the helical band, the stem having an outer screw thread, and an adjusting sleeve axially assembled to an end of the handle, said adjusting sleeve being screw threadedly engaged on the screw thread of the stem for axially adjusting the stem relative to the first ring.

2. A screw-driver according to claim 1, wherein said first ring comprises a rib and said stem comprises an axial spline in which said rib is engaged, and said third ring comprises a spline and said stem has a helical groove in which said spline of said third ring is movable.

3. A screw-driver according to claim 1, wherein said first and third rings respectively each comprise a spline, and said stem comprises a first helical spline cooperative with the spline of the first ring and a second helical spline cooperative with the spline of the third ring, the two cooperative splines having different pitches.

4. A screw-driver according to claim 1, further comprising a control drum which is fixed on said stem and surrounds said adjusting sleeve and carries at an inner end of said drum adjacent said sleeve a circular graduation.

5. A screw-driver according to claim 4, wherein said sleeve includes a skirt portion which axially extends from said sleeve and carries a longitudinal graduation, said drum surrounding said skirt portion.

6. A screw-driver according to claim 1, comprising a transparent sheath which surrounds said adjusting sleeve in the extension of said handle and is connected to said adjusting sleeve.

7. A screw-driver according to claim 1, further comprising a withdrawable locking device which is controllable from outside the screw-driver for selectively rigidly interconnecting said sleeve and said stem in use of the screw-driver and releasing said sleeve from said stem for adjusting the axial position of said stem relative to said first ring.

8. A screw-driver according to claim 1, wherein said torsion spring has an end remote from said stem and is engaged in said second ring, a core member being provided for fixing said end of said spring in said second ring, the axial position of said core member relative to said second ring and said spring adjusting an active length of said spring.

9. A screw-driver according to claim 8, wherein said second ring has a helical inner groove for receiving coils of said spring and said core member includes a corresponding outer helical groove and is screwed inside said coils of said spring and is axially adjustable relative to said spring by rotation of said core member relative to said spring.

* * * * *